Oct. 10, 1961  E. C. LUNDAHL  3,003,780
VERTICALLY ADJUSTABLE TANDEM TYPE RUNNING GEAR FOR VEHICLES
Filed Jan. 6, 1958  5 Sheets-Sheet 1
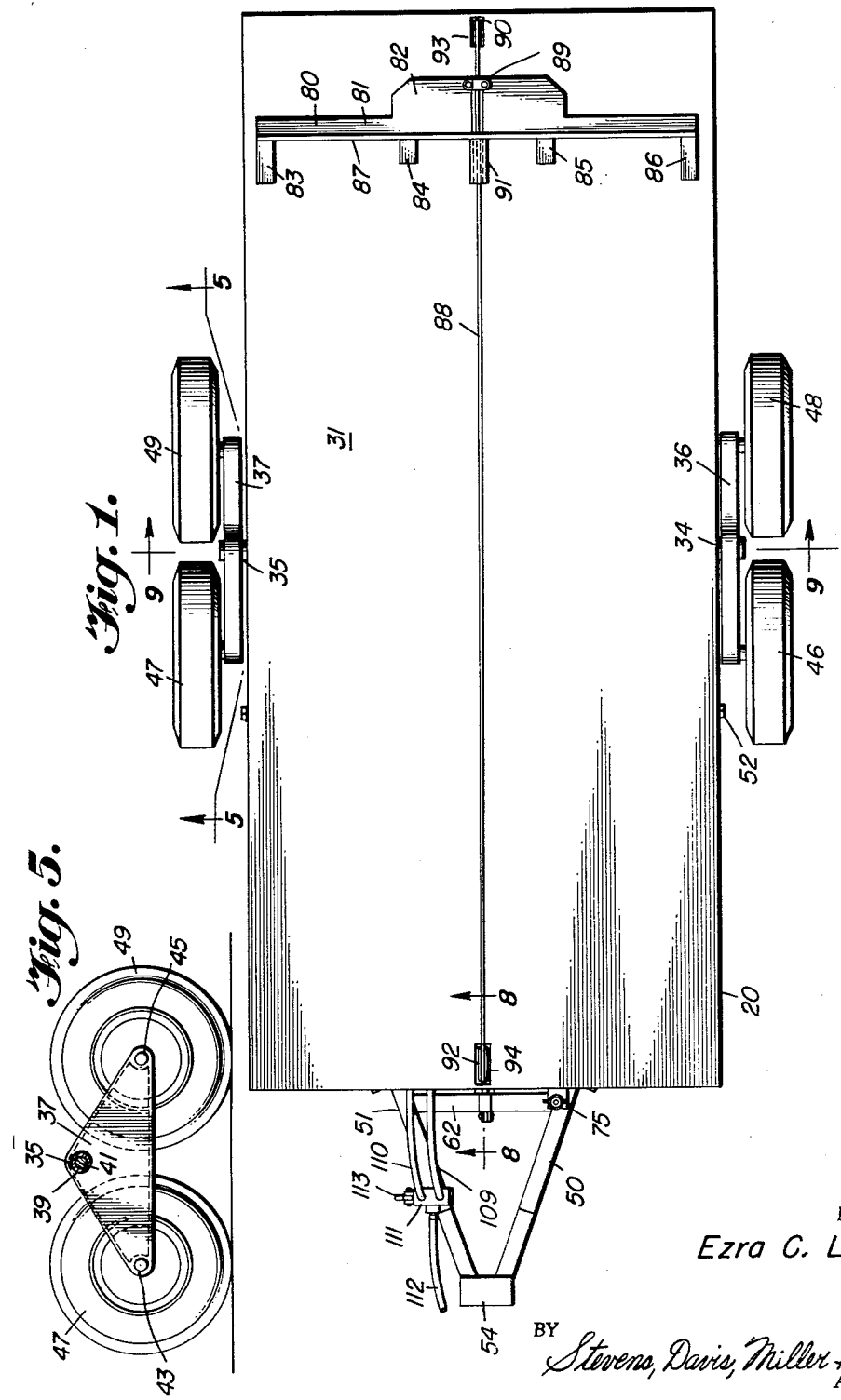
INVENTOR
Ezra C. Lundahl
BY
Stevens, Davis, Miller + Mosher
ATTORNEYS

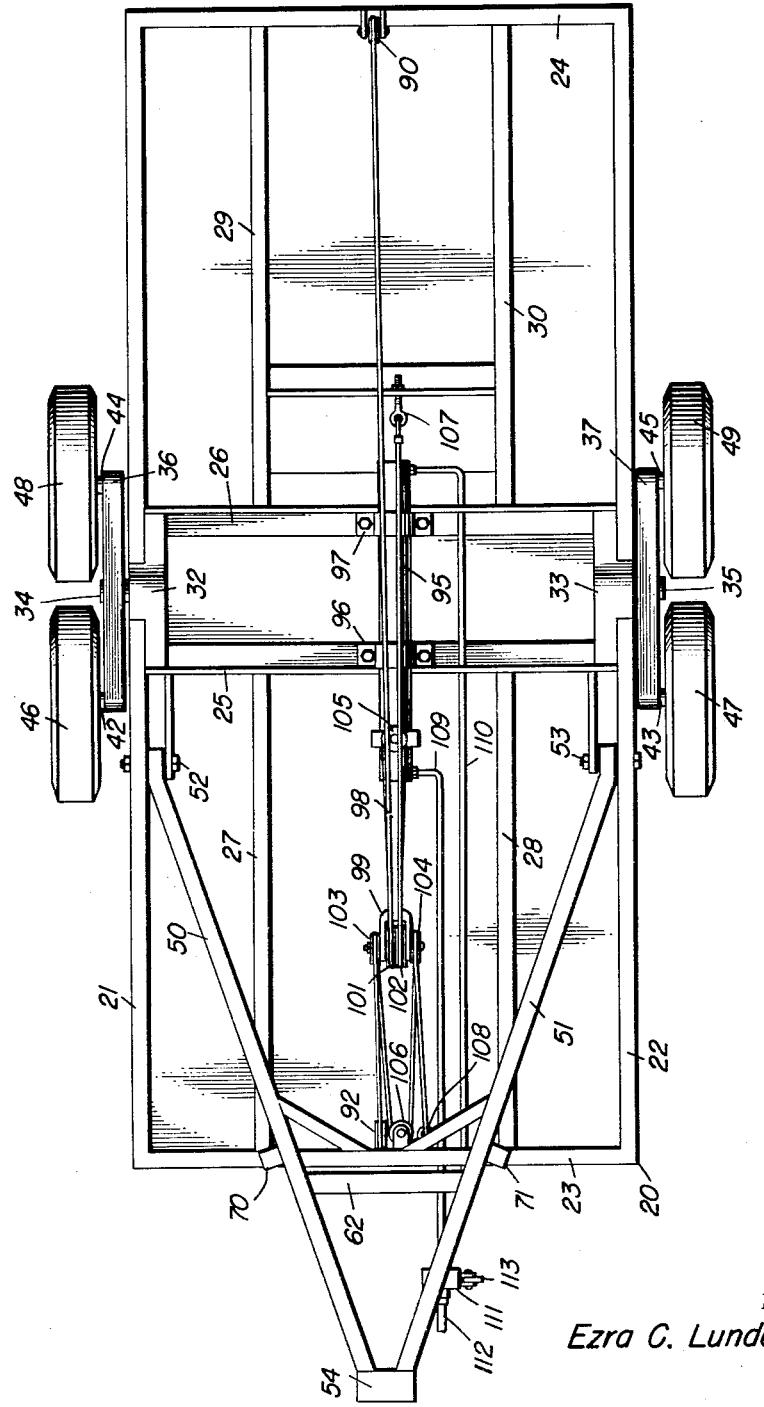

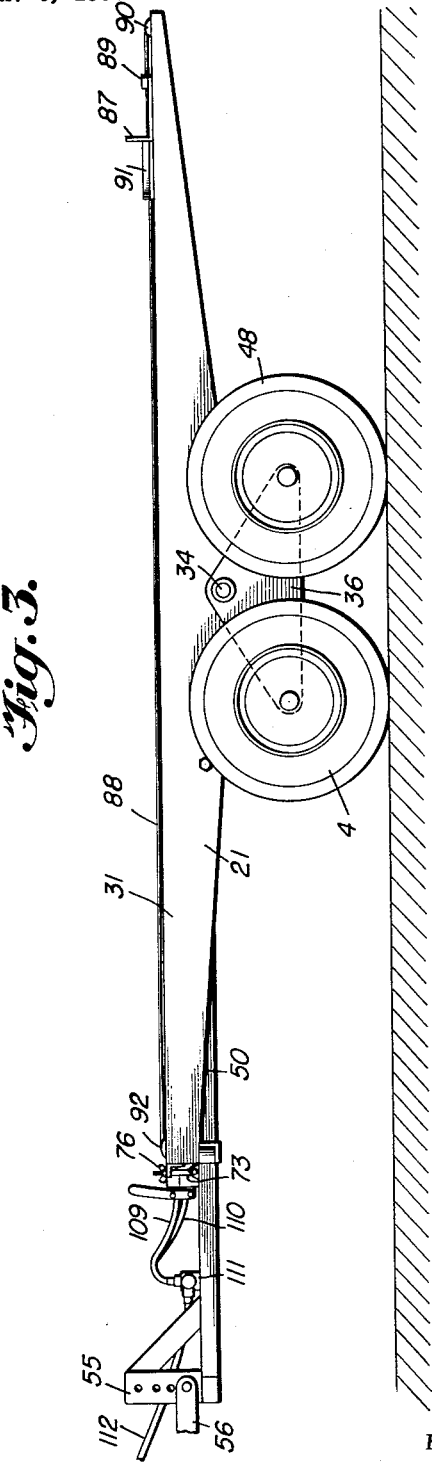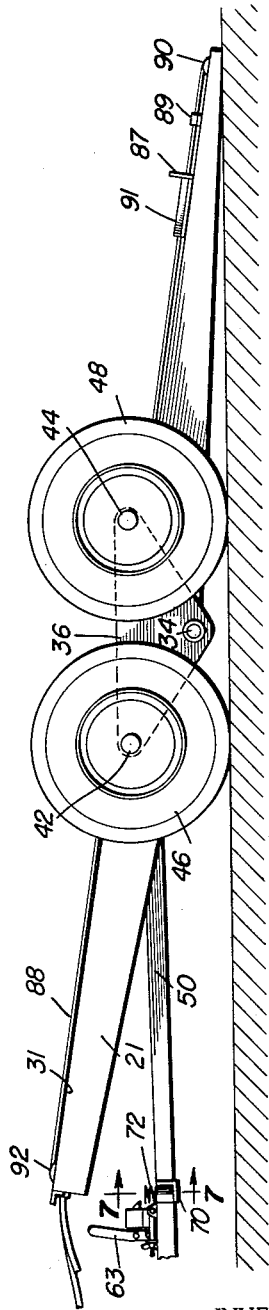

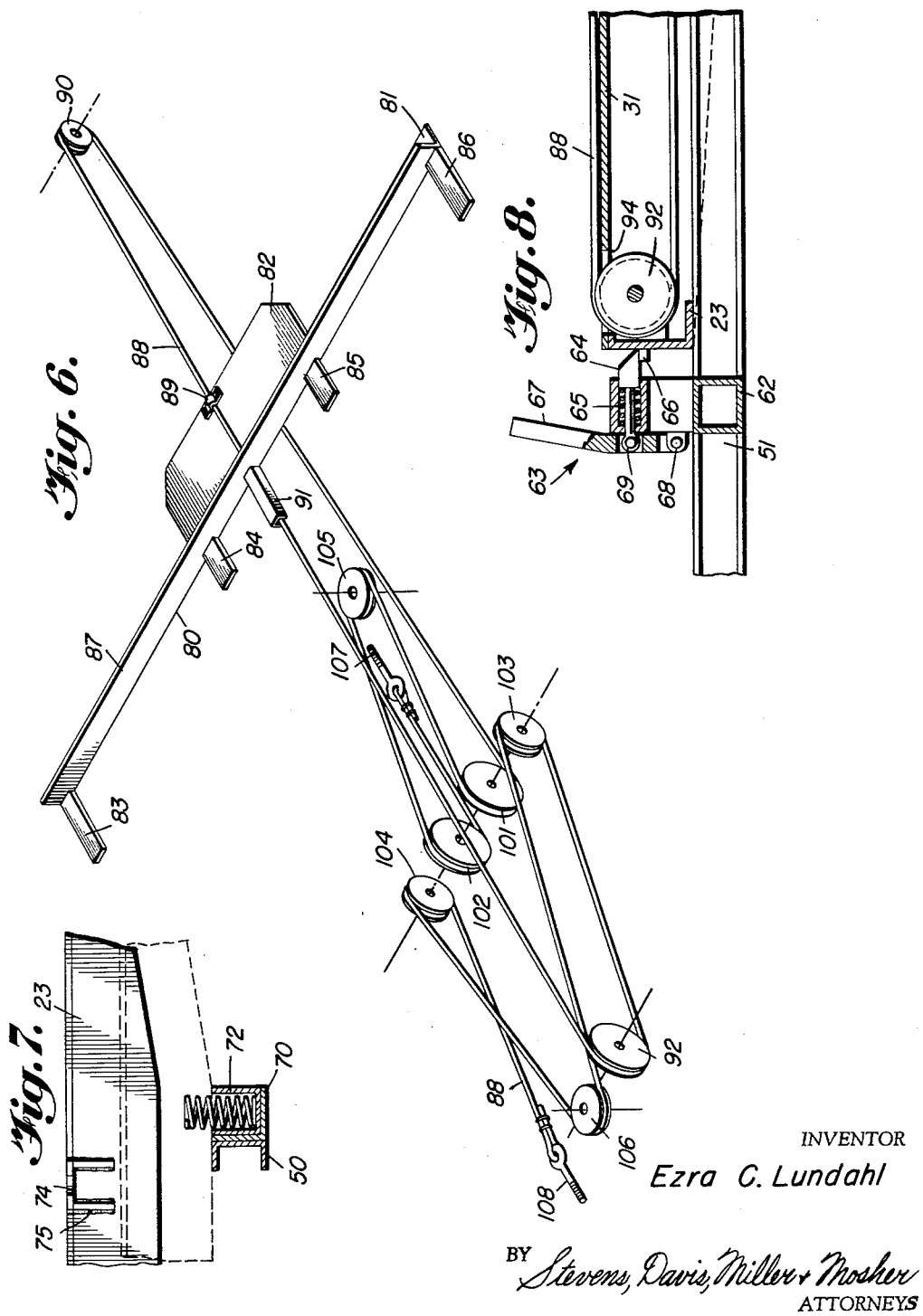

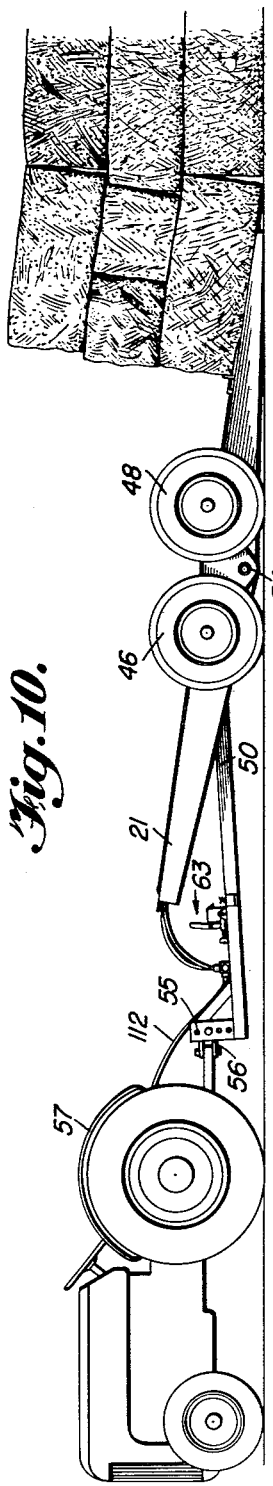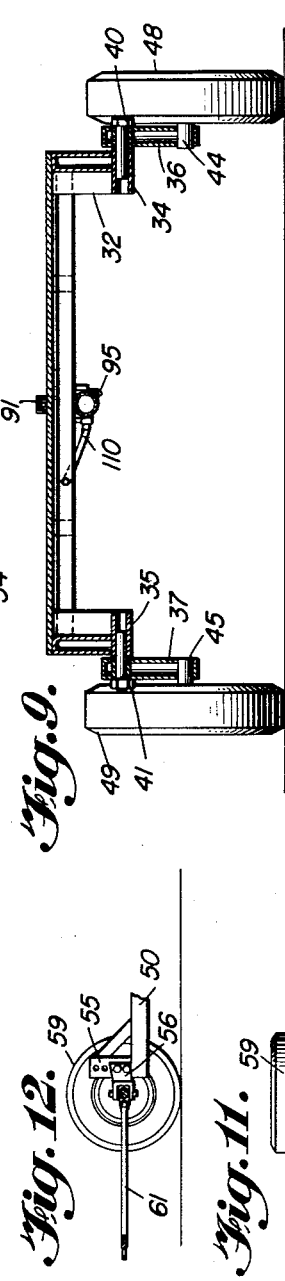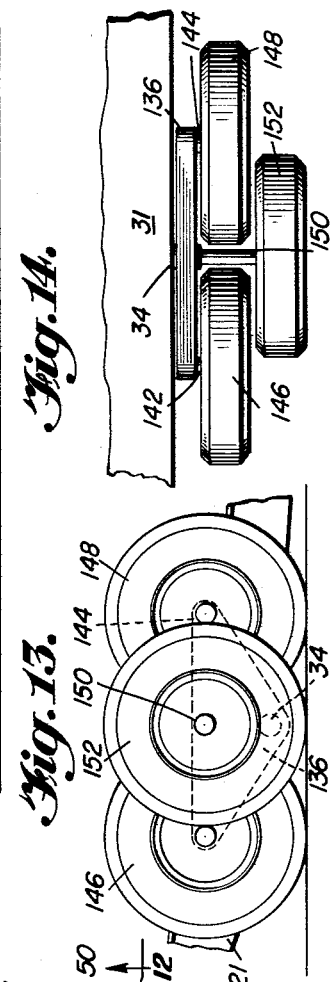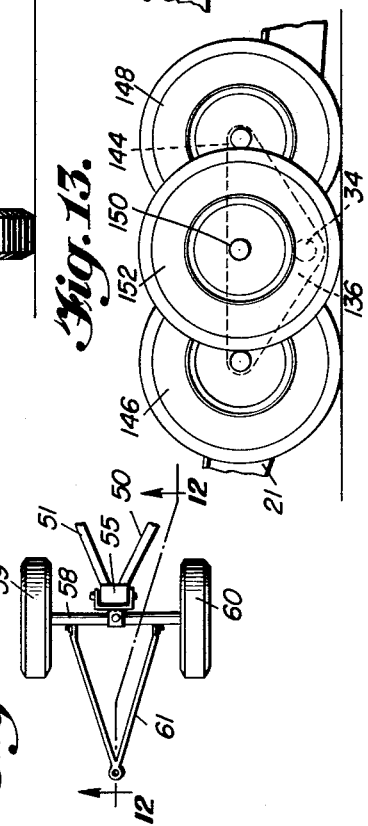
INVENTOR
Ezra C. Lundahl

United States Patent Office 3,003,780
Patented Oct. 10, 1961

3,003,780
VERTICALLY ADJUSTABLE TANDEM TYPE
RUNNING GEAR FOR VEHICLES
Ezra C. Lundahl, Logan, Utah, assignor to Ezra C. Lundahl, Inc., Logan, Utah, a corporation of Utah
Filed Jan. 6, 1958, Ser. No. 707,349
1 Claim. (Cl. 280—43)

The present invention relates to an improved self-unloading and loading wagon of the type generally employed on a farm for the purpose of hauling bulky cargo, such as baled hay and the like. More particularly, the present invention pertains to a wagon of the type referred to above which is convertible into a plurality of different forms not heretofore attainable with other wagons of the same general type.

Prior to the present invention, loading and unloading wagons meeting those requirements satisfied by the unitary device of the instant application, have been of two distinctly different types: the first type is the so-called "low bed" wagon having a bed located relatively close to the ground and being pivotal so as to permit the loading and unloading of material onto and from the bed; the second type is the so-called "high bed" wagon having a bed substantially higher from the ground—this high bed wagon (generally not tiltable) is customarily used in conjunction with platforms or elevators located above ground level for the purpose of loading and unloading material onto and from the wagon.

In accordance with the present invention a unitary device or mechanism is provided whereby the bed of the wagon may be converted from the low bed position to the high bed position so as to meet the handling requirements which had previously been satisfied by the two different types of wagons referred to above.

Therefore, it is a principal object of the present invention to provide a self-unloading and loading wagon of the type referred to herein wherein the bed of the wagon is easily and quickly converted from the low bed to the high bed position, or vice versa.

Another object of the present invention is to provide a wagon of the type referred to above including an improved means for unloading the wagon.

It is another object of the present invention to provide a self-unloading and loading vehicle of simple yet rugged construction which possesses substantially greater versatility than heretofore attainable.

Other and further objects and advantageous features of the present invention will hereinafter more fully appear from a detailed consideration of the drawings in which:

FIGURE 1 is a plan view of a wagon constructed in accordance with the present invention;

FIGURE 2 is a bottom view of the same wagon as shown in FIGURE 1;

FIGURE 3 is a view in side elevation showing the wagon in its "high bed" position;

FIGURE 4 is a view in side elevation showing the wagon in its "low bed" position, the bed being tilted for unloading purposes;

FIGURE 5 is a view in side elevation taken along line 5—5 of FIGURE 1 showing the details of one of the wheel assemblies;

FIGURE 6 is a perspective view of the unloading bar and the pulley system associated therewith;

FIGURE 7 is a fragmentary sectional view taken along section line 7—7 of FIGURE 4, showing a portion of the bed-locking arrangement;

FIGURE 8 is a fragmentary sectional view taken along section line 8—8 of FIGURE 1, showing additional details of the bed-locking arrangement;

FIGURE 9 is a sectional view of the wagon body and associated wheel structure taken along section line 9—9 of FIGURE 1;

FIGURE 10 is a side elevation of a wagon of the present invention showing its relation with a tractor and a load of hay which is being unloaded, the wagon being tilted to the self-unloading position while in the "low bed" position;

FIGURE 11 is a plan view of an alternative hitching means;

FIGURE 12 is a section view taken along section line 12—12 of FIGURE 11 showing further details of the alternative hitching means;

FIGURE 13 is a side elevation of a modified form of the wheel assembly; and

FIGURE 14 is a plan view of the modified wheel assembly shown in FIGURE 13.

Referring to the drawings in detail, there is shown a self-unloading wagon including a substantially rectangular frame 20 having longitudinal side rails 21 and 22 and transverse end rails 23 and 24 (see especially FIGURE 2). Frame 20 also includes a pair of centrally located and transverse cross bars 25 and 26, a pair of longitudinal bars 27 and 28 connecting between end rail 23 and cross bar 25, and a pair of longitudinal rails 29 and 30 connecting between cross bar 26 and end rail 24. This bed frame 20 including elements 21–30, inclusive, is generally constructed of metal, preferably steel.

At the upper surface of the frame 20, a flat bed 31 is bolted, welded, or otherwise secured to the frame 20; this flat bed 31 is preferably composed of flat metal plates which are welded to the frame 20, but, as a possible alternative, this bed could be formed from a plurality of parallel wooden planks extending lengthwise of the frame 20 and suitably secured thereto.

As best shown in FIGURES 2 and 9, the longitudinal rails 21 and 22 are provided with a pair of enlarged and downwardly extending portions 32 and 33, respectively. These triangular portions 32 and 33 also include a pair of short transverse axles 34 and 35 which are in axial alignment with each other and which provide the pivotal axis for the tilting of the wagon bed as will hereinafter appear.

The wheel assemblies for supporting the sides of the wagon frame 20 include a pair of triangular plates 36 and 37, each having substantially the shape of an obtuse isosceles triangle. Triangular plates 36 and 37 are provided with holes 38 and 39 (adjacent the obtuse apices thereof) for receiving the ends of axles 34 and 35, respectively. Flat headed pins or bolts 40 and 41 (see especially FIGURE 9) will fit into and engage corresponding holes in axles 34 and 35, respectively, so as to prevent lateral disengagement of the triangular plates 36 and 37 from the axle members 34 and 35, respectively, while at the same time permitting said triangular plates 36 and 37 to freely rotate about their respective axle members. The purpose of this latter rotational movement of the plates 36 and 37, relative to axles 34 and 35, will hereinafter more fully appear. (It should be understood that various bearings including thrust bearings might be provided where desired.) Triangular plate 36 is provided with a pair of wheel axles 42 and 44 for supporting thereon a pair of wheels 46 and 48. Similarly, triangular plate 37 is provided with a pair of wheel axles 43 and 45 for supporting thereon a pair of wheels 47 and 49.

For the purpose of drawing or pulling the wagon, there are attached to the underside (adjacent the forward portion) of the frame 20, a pair of converging arms 50 and 51 which are pivotally attached to frame members 21 and 22 by means of bolts 52 and 53, respectively. The forward ends of arms 50 and 51 are connected together by means of a short cross member 54. Cross member 54 is provided with an upright portion 55 having therein a plurality of spaced holes to permit selective engagement (at different levels) with a suitable hitching means 56 (as indicated in FIGURE 3). As shown, for example, in FIGURE 10, this hitching means 56 might be associated with a tractor 57; alternatively, as shown in FIGURES 11 and 12, this hitching means 56 might be associated with a separate pivotal two wheeled dolly, the latter being constituted by an axle 58 pivotally attached at its center to the hitch 56, a pair of wheels 59 and 60 rotatably attached to the ends of the axle 58, and a triangular-shaped draw bar 61 secured to the axle 58. The draw bar 61 will permit attachment of the dolly to some auxiliary pulling means such as a tractor.

In the absence of some locking means for securing the wagon in a substantially horizontal position, particularly as shown in FIGURE 3, it should be understood that the bed or frame of the wagon would be permitted to rock or tilt about the axle members 34 and 35; of course, such is advantageous when it is desired to unload the wagon, as illustrated in the FIGURE 4 and FIGURE 10 positions. When the wagon is being drawn along the surface of the ground, with or without a load thereon, it is desirable that some means be included for locking the bed in a horizontal position. Therefore, for this purpose, arms 50 and 51 are provided with a cross bar 62 upon which a latch means 63 is mounted. (See especially FIGURES 3, 4, 7 and 8.)

This latching means 63 includes a slidable locking bolt 64 which, as it appears in FIGURE 8, is spring-urged to the right by a spring 65, so as to engage a suitable abutment 66 on the end rail 23 of the wagon frame. The upper surface of the slidable locking bolt 64 is inclined as shown in FIGURE 8 such that, when the wagon is tilted towards the locking position, the abutment 66 will urge the locking bolt 64 to the left (against the action of the spring 65) until the abutment 66 is in the locked position shown. A handle 67 is pivotally attached to the latching means 63, as at 68, and is also attached intermediate the ends thereof, as at 69, to the slidable locking bolt 64, such that counterclockwise movement of the handle 67 (as shown in FIGURE 8) will cause movement of the locking bolt 64 to the left, thus permitting the tilting of the wagon bed away from the locked position. For the purpose of preventing undue vibration between the wagon frame 20 and the arms 50 and 51 when the wagon is in the locked position, and also for the purpose of facilitating the initial movement of the frame away from the locked position when the handle 67 is moved to the releasing position, a pair of hollow pockets 70 and 71 are attached to the sides of arms 50 and 51, respectively, so as to be positioned immediately below the end rail 23. As best shown in FIGURE 7, the pocket 70 (also, the pocket 71) includes a spring means 72 which is received within the pocket and which is adapted to engage the underside of the cross member 23 and to be compressed in the pocket when the frame is locked in the horizontal position.

An auxiliary locking means consists of a toggle bolt 73 (or a pair of toggle bolts) pivotally attached to the cross member 62 and adapted to be received in a suitable slot 74 in a bracket member 75 which is secured to the forward end of the end rail 23. A suitable wing nut 76 will permit the locking of the toggle bolt 73 in the bracket 75. In FIGURE 7 the solid line positions of the frame member 23 and the spring means 72 represent a slightly tilted condition of the bed; in the dotted line position of the frame member 23, the spring 72 would be compressed within the pocket 70 and the wagon frame would, in this instance, be in the locked position.

For the purpose of unloading baled hay or other material from the surface of bed 31, there is provided a horizontally slidable and vertical upright member (or "false front") 80. This false front 80 includes a substantially flat bed-contacting portion 81 having an enlarged rearwardly projecting portion 82 at the center thereof and a plurality of forwardly projecting horizontal tabs 83, 84, 85 and 86, the latter being added to prevent the false front 80 from tilting when sliding along the surface of the bed 31. False front 80 also includes an upright portion 87, which, as will appear hereinafter, is the portion of the false front 80 which contacts the load and forces the same from the bed 31 as the false front is moved from the forward end of the wagon to the rear thereof.

Movement of the false front 80 is effected by means of a cable 88 which is attached to the rearwardly extending portion 82 by means of a clamp 89. Along the upper surface of the bed 31, cable 88 passes to the rear over a pulley 90 to the underside of the wagon. In the forward direction the cable 88 passes through a guide means 91 which is secured to the upright portion 87 of the false front 80 and from here cable 88 passes along the upper surface 31 of the bed to a second pulley 92 and thence to the underside of the wagon. Pulleys 90 and 92 are mounted for free rotation on suitable brackets (the details of which are considered conventional and, hence, not shown) which are secured to cross rails 24 and 23, respectively; the uppermost ends of pulleys 90 and 92 project through suitable slots 93 and 94, respectively, in the bed 31 of the wagon.

For the purpose of moving the cable 88 and, hence, the false front 80 in either the forward or rearward direction, there is provided a hydraulic cylinder 95 which is secured to the underside of the frame 20 by means of straps 96 and 97 which are bolted to cross members 25 and 26, respectively. A piston is reciprocably mounted within the hydraulic cylinder 95 such that the external piston rod 98 projects outwardly from the cylinder 95 towards the forward end of the wagon frame 20. The forward end of the piston rod 98 is forked at 99 and a bolt 100 passes through suitable holes in the forked end 99 of this piston rod. A pair of pulleys 101 and 102 are freely rotatably mounted on the bolt 100 between the bifurcations of the forked end 99. On the outside of the bifurcations, a pair of smaller pulleys 103 and 104 are freely rotatably mounted between the ends of the bolt 100. Pulleys 101, 102, 103 and 104, as is also the case with pulleys 90 and 92, are mounted for rotation on substantially horizontal axes. An additional pulley 105 is secured to the upper surface of the cylinder 95 and adapted to rotate freely on a vertical axis. Still another pulley 106 is secured by means of a suitable bracket to the end rail 23 so as to rotate also on a vertical axis. One end of the cable is attached to an eye-bolt 107 which is secured to the frame of the wagon adjacent the rear end of the hydraulic cylinder 95. The other end of the cable is attached to an eye-bolt 108 which is suitably bolted to the end rail 23. Pulleys 90, 92, 105 and 106 are freely rotatable on their own axes, but they are otherwise immovable; pulleys 101, 102, 103 and 104, on the other hand, are not only freely rotatable about the axis defined by the bolt 100 but they are also movable as a unit in a horizontal direction whenever the piston rod 98 is caused to move in such a direction.

A pair of hydraulic conduits 109 and 110 are in communication with the interior of the hydraulic cylinder 95 at the front and rear ends thereof, respectively. Hydraulic conduits 109 and 110 connect at their other ends to a suitable valve 111. A source of hydraulic fluid under pressure is supplied to the valve 111 through conduit 112. Movement of the handle 113 of the valve 111 will place the pressure conduit 112 in communication with either conduit 109 or 110 depending upon the position of the handle 113. Conduit 112 may lead to any suitable source of hydraulic fluid under pressure, as for example, a hydraulic pump positioned on and operated by the tractor 57.

The winding of the cable 88 around the various pulleys will now be described with particular reference to FIG- URE 6. Starting at the eye-bolt 108, cable 88 passes rearwardly under the lower side of pulley 104 around pulley 104 and from the upper side thereof around pulley 106 to the upper side of pulley 103; from the underside of pulley 103, cable 88 passes around the underside of pulley 92 and from the upper side of pulley 92 on to the upper surface of the bed 31 (not shown in this figure). Again, from the upper end of pulley 92, cable 88 passes through guide means 91 to the clamp 89 and from here to the upper end of pulley 90 and around pulley 90 to the underside of the wagon; from the lower end of pulley 90 cable 88 passes to the lower end of pulley 101 around pulley 101 to the upper end thereof and from here around pulley 105 back to the upper end of pulley 102; cable 88 passes around pulley 102 and from the underside of pulley 102 to the eye-bolt 107.

For the purpose of comparing the relative movements of the piston rod 98 and the false front 80, the cable 88 shall be considered as being divided into two portions; that is, one portion extending from the eye-bolt 107 to the clamp 89, and the other portion extending from the eye-bolt 108 to the clamp 89. Thus, it should be apparent from a consideration of FIGURES 2 and 6 that when the piston rod 98 is moved in a forward direction, a pulling force would be exerted against the eye-bolt 107, and this pulling force would be translated through the portion of the cable extending from eye-bolt 107 to the bracket 89, such that the false front 80 would be pulled in a rearwardly direction; this movement of the piston rod 98 and false front 80 would be employed for the purposes of unloading material from the bed 31. On the other hand, if the piston rod 98 were forced in a rearwardly direction, a pull would be exerted against the eye-bolt 108 and this pull would be translated again around the various pulleys to the bracket 89 such that the false front 80 would be pulled towards the forward end of the wagon; this particular movement of the piston rod 98 and false front 80 would be employed to return the false front to its initial position prior to loading, or it could be employed for the purpose of pulling some article, such as a tractor or other vehicle, onto the bed. Of course, in the latter instance, a rope or chain would be provided to connect the vehicle with the false front prior to the loading of the vehicle onto the wagon.

FIGURES 13 and 14 show a modified form of a wheel assembly which might be employed with the wagon of the instant invention. In these figures there is shown a triangular mounting plate 136 which is substantially the same as the corresponding triangular plate 36 shown in FIGURES 3 and 4. Triangular plate 136 would be rotatably mounted on axle 34 as in the former case; also, wheels 146 and 148 would be rotatably mounted on wheel axles 142 and 144 in a similar fashion. In the case of FIGURES 13 and 14, however, a third and longer wheel axle 150 is provided such that axles 142 and 144 and 150 are in substantially the same plane. A third wheel 152 is rotatably mounted on the end of axle 150. It should be understood, of course, that in the case of FIGURES 13 and 14, although but one wheel assembly is shown, a similar wheel assembly would be used on the other side of the wagon.

From a consideration of the foregoing description, it should be apparent that the wagon can be converted from the high bed position where the bed is above the tops of the wheels as shown in FIGURE 3 to the low-bed position shown in FIGURES 4 and 10 by the simple expedient of rotating the triangular plates 36 and 37 one-half revolution about the axles 34 and 35, respectively; of course, during this turning procedure, it will be necessary to elevate the wagon slightly from the ground. Assuming (from the FIGURE 3 position) that the forward end of the wagon is secured to some supporting means located forward of the wagon through the medium of the connecting link 56, it is merely necessary to jack up the rear end of the wagon until sufficient clearance is provided to permit rotation of the wheel assemblies. Thereafter, the jack means will be removed and the wagon can assume the low-bed position shown in FIGURES 4 and 10. (The latter figures, of course, show in addition, the tilted arrangement of the wagon.) The members 56 and 55 may then be disconnected and reunited such that the forward end of the vehicle would be connected at the correct vertical elevation. The reverse procedure may be employed when it is desired to change from the low-bed position to the high-bed position.

FIGURE 10 is illustrative of the present invention where it is desired to unload baled hay (or other stacked material) from the bed 31 of the wagon, the latter being in the low bed position. Prior to the condition reached in FIGURE 10, it will be assumed that the wagon, fully loaded with baled hay, is conveyed or pulled by means of the tractor 57 from the location where the wagon was loaded to the location where it is desired to unload the hay. During the time that the wagon is drawn over the ground, the wagon bed will be retained in a horizontal position by virtue of the engagement of the latch means 63. When the location for the desired unloading is reached, the wagon and tractor are stopped and the latch means 63 is released to permit the tilting of the rear end of the bed 31 downwardly. Now, the handle 113 of the valve 111 may be turned to the position required for the forcing of the false front (or unloading bar, as it may be called) towards the rear of the wagon; at the same time that the false front 80 and in particular, the vertical portion 87 thereof, is being forced rearwardly against the load of baled hay, the wagon is drawn slowly forward by means of the tractor 57 so as to permit the bed 31 to slide under and away from the load of hay. Thus, the relative positions between the wagon and load of hay, as shown in FIGURE 10, represent that condition where they hay is almost completely unloaded from the bed of the wagon. Normally, the baled hay will be loaded onto the wagon bed (when locked in the horizontal position) at the location of loading by stacking the bales of hay by hand; however, it is possible, provided that the baled hay has been properly stacked on pallets, to load the baled and stacked hay onto the bed 31 of the wagon by backing up the wagon, when in the tilted condition shown in FIGURE 10, so as to force the entire load upwardly onto the inclined bed 31.

In FIGURES 2 and 6, the means for forcing the false front in either the forward or rearward direction, which means includes the hydraulic cylinder and piston, and the cable and pulley arrangement illustrated herein, represents the preferred arrangement of the present invention; the way in which the cable 88 is wound around the various pulleys, as shown in these figures, represents a condition wherein the various pulling forces appear to be best balanced, such that the likelihood of bending of the piston rod 98 under heavy loads is minimized. It should be understood, however, that other equivalent means, i.e., for moving the false front, might be employed within the spirit and scope of the present invention.

The modified wheel assemblies shown in FIGURES 13 and 14 are, in the first instance, capable of withstanding greater loads than the wheel assemblies shown in the prior figures; also, the wagon appears to have better lateral stability where the three-wheeled assemblies are employed.

Other and further modifications of the present invention, apart from those shown or suggested herein, may be made within the spirit and scope of this invention.

What is claimed is:

A self-unloading wagon of the type described comprising a substantially rectangular frame, a frame axle extending outwardly for each side of said frame adjacent the center thereof, a wheel supporting plate mounted on the outer end of each frame axle for pivotal movement thereon for at least 180° relative to said frame, a pair of wheel axles projecting outwardly from each of said wheel supporting plates, the pair of wheel axles of each wheel supporting plate being arranged in triangular fashion with the corresponding end of the frame axle, a third wheel axle mounted on each wheel supporting plate, the central axis of each third wheel axle lying in a common plane with the central axes of said pair of wheel axles associated with the same wheel supporting plate, and a wheel rotatably mounted on each of said wheel axles, whereby in a first position of said wheel supporting plates, said frame will be supported in a first horizontal position, and whereby upon pivoting of said wheel supporting plates through 180° to a second position said frame will be supported in a second horizontal position spaced from said first horizontal position.

References Cited in the file of this patent

UNITED STATES PATENTS

| | | |
|---|---|---|
| 1,239,328 | Whitcomb | Sept. 4, 1917 |
| 1,318,819 | Preston | Oct. 14, 1919 |
| 1,918,289 | Remde | July 18, 1933 |
| 2,134,233 | McKone | Oct. 25, 1938 |
| 2,487,325 | Foster | Nov. 8, 1949 |
| 2,488,002 | Carraher | Nov. 15, 1949 |
| 2,530,350 | Ehlert | Nov. 14, 1950 |
| 2,550,230 | Dalton | Apr. 24, 1951 |
| 2,596,390 | Essick | May 13, 1952 |
| 2,713,179 | Clifton | July 19, 1955 |
| 2,748,965 | Grey | June 5, 1956 |
| 2,848,126 | Taylor | Aug. 14, 1958 |
| 2,876,466 | Baldwin | Mar. 10, 1959 |

FOREIGN PATENTS

| | | |
|---|---|---|
| 145,817 | Sweden | June 15, 1954 |
| 872,179 | France | Feb. 5, 1942 |